United States Patent [19]

Stevens et al.

[11] 4,029,737

[45] June 14, 1977

[54] REDOX TREATMENT OF ALUNITE ORE

[75] Inventors: Douglas Stevens, Golden, Colo.;
Helge O. Forberg, Owensboro, Ky.;
Larry D. Jennings, Arvada, Colo.;
David L. Thompson, Arvada, Colo.;
Julian V. Copenhaver, Arvada, Colo.

[73] Assignees: Southwire Company, Carrollton,
Ga.; National Steel Corporation,
Pittsburgh, Pa.; Earth Sciences, Inc.,
Golden, Colo.

[22] Filed: Apr. 9, 1976

[21] Appl. No.: 675,383

[52] U.S. Cl. .............................. 423/127; 423/120;
423/122; 423/567 R; 423/131; 423/629;
423/522
[51] Int. Cl.² .................... C01F 7/06; C01F 7/14
[58] Field of Search .......... 423/111, 120, 122, 127,
423/131

[56] References Cited
UNITED STATES PATENTS

| | | | |
|---|---|---|---|
| 3,890,425 | 6/1975 | Stevens et al | 423/127 |
| 3,890,426 | 6/1975 | Stevens et al. | 423/127 |

*Primary Examiner*—Herbert T. Carter
*Attorney, Agent, or Firm*—Van C. Wilks; Herbert M. Hanegan; Stanley L. Tate

[57] ABSTRACT

This invention relates to a method for recovering aluminum hydroxide from alunite ore by roasting the ore to remove water of hydration, roasting it again in a reducing atmosphere to remove sulfate, roasting a third time in an oxidizing atmosphere to convert any sulfides formed in the second roast, leaching with a weak base, leaching with water to remove potassium and sulfate, extracting the aluminum content with a mixture of sodium hydroxide and potassium hydroxide, removing contaminant silica from the leach solution, and precipitating aluminum hydroxide by cooling and seeding the solution.

24 Claims, 2 Drawing Figures

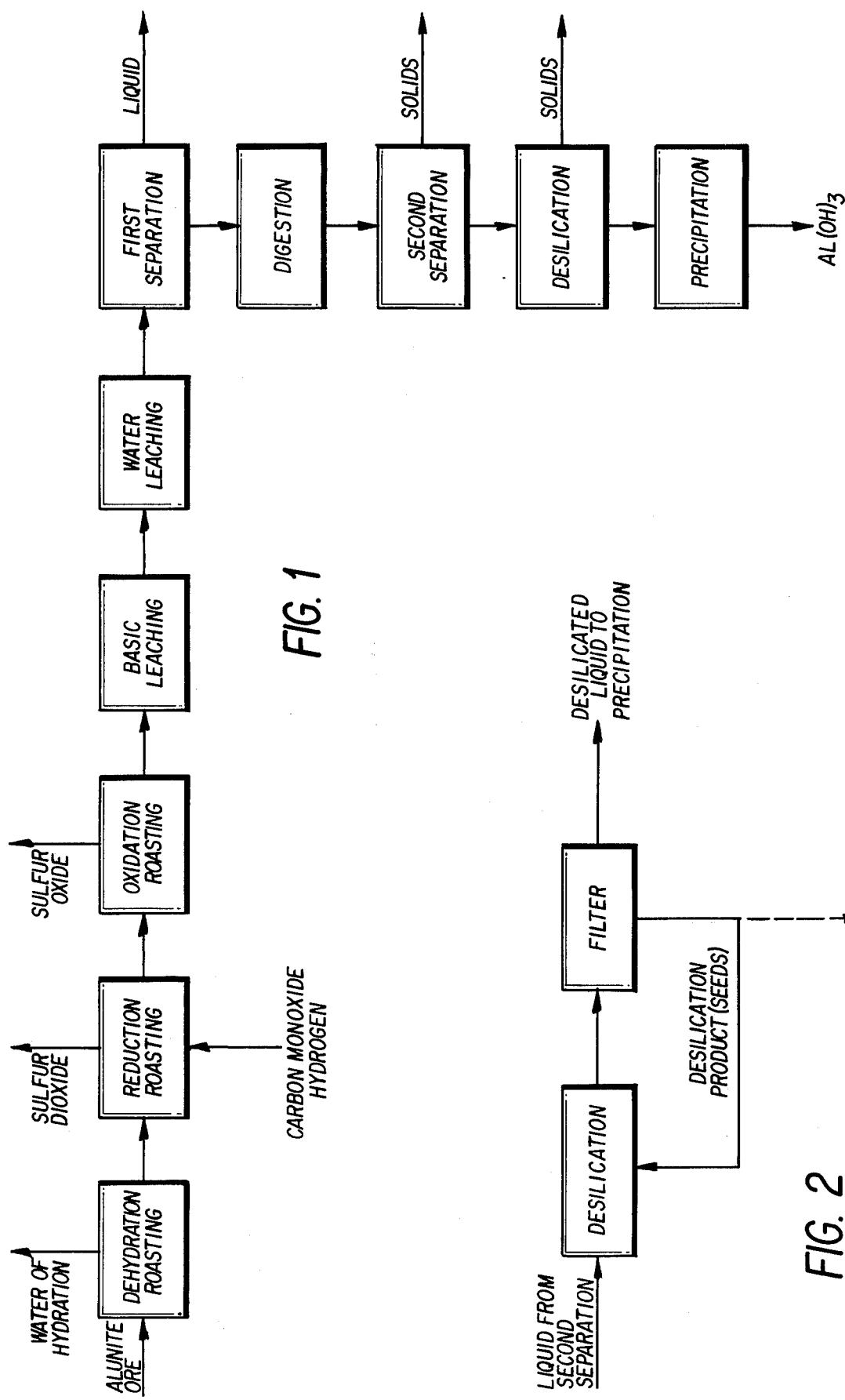

REDOX TREATMENT OF ALUNITE ORE

FIELD OF THE INVENTION

The present invention concerns a method for recovering aluminum hydroxide from ore containing alunite by calcination, roasting the calcined ore in a reducing atmosphere, further roasting the reduced ore in an oxidizing atmosphere, leaching with a weak base, leaching with water and subsequent digestion of the solids resulting from the water leach with a mixture of alkali metal hydroxides.

DESCRIPTION OF THE PRIOR ART

Various techniques have been proprosed for recovering alumina from ore containing alunite. Of the various techniques disclosed by the prior art the general method involves treating alunite ore with concentrated sulfuric acid following by roasting or vice versa, with $SO_3$ recovered as a bi-product and subsequently converted into sulfuric acid and reused in the process, the aluminum being retained in solution as a sulfate. Potash (KOH) is then added to a pH of between 1 and 2 to precipitate alum $[K_2SO_4.Al_2(SO_4)_3.18H_2O]$. After precipitation the alum is then roasted to disassociate the aluminum sulfate, with the production of $SO_3$ and aluminum oxide which are then recovered by $H_2O$ leach to remove $K_2SO_4$ leaving $Al_2O_3$. Ordinarily the prior art practioners have used much effort and expense to eliminate potash. U.S. Pat. No. 1,948,887 (Saunders) is representative of the prior art techniques. U.S. Pat. No 1,406,890 (Pedersen) further discloses the precipitation of "potash alumn" by the addition of potassium sulfate to an acidic leach solution. Loevenstein, U.S. Pat. No. 2,958,580, teaches the recovery of aluminum as aluminum sulfate by digesting aluminum ore with sulfuric acid.

Although each of the aforementioned techniques may be useful for the particular application referred to, none of these conventional techniques is suitable for recovering aluminum hydroxide from a low grade aluminum ore containing alunite, which consists of aluminum, potassium, sodium, sulfate and water. Such ore being domestic to the United States is large quantities offers a relatively untouched source of aluminum.

Although U.S. Pat. No. 3,890,425 discloses a method of recovering aluminum hydroxide from alunite the process disclosed is different from the process of the present invention and the byproducts recovered are different from the byproducts recovered using the instant process.

SUMMARY OF THE INVENTION

It is, therefore, an object of the present invention to provide a method for overcoming the aforementioned disadvantages of the prior art techniques for recovering aluminum hydroxide from ore containing alunite.

It is a further object of the present invention to provide a novel method for economically extracting aluminum hydroxide from ore containing alunite.

Another object of this invention is to provide a novel and economical method for separating aluminum hydroxide and other valuable components from ore containing alunite, which consists of aluminum, potassium, sodium, sulfate and water.

This and other objects, features and advantages of the present invention will be apparent from the following description and the accompanying drawings.

BRIEF DESCRIPTION OF THE DRAWINGS

FIG. 1 is a general diagrammatic representation of an embodiment of this invention.

FIG. 2 is a diagrammatic representation of an embodiment of this invention depicting an optional method of silica removal.

DESCRIPTION OF THE PREFERRED EMBODIMENTS

Referring to FIG. 1, which is a general diagrammatic flow sheet of an embodiment of this invention, ore containing what is commonly known as alunite, which has an approximate empirical formula of $[K_2Al_6(OH)_{12}(SO_4)_4][Na_2Al_6(OH)_{12}(SO_4)_4]$ and or combinations thereof, is roasted to remove the water of hydration, roasted again in a reducing atmosphere to liberate a portion of the sulfate present as $SO_2$, roasted a third time in an oxidizing atmosphere to convert any sulfides formed in the reduction roast, leached with a weak base, and leached with water and the liquid and solid portions of the resultant slurry are separated. The solid component is then digested with a mixture of alkali metal hydroxides and the liquid and solid portions are separated in a second separation step. The liquid portion is heated and/or seeded to remove silica by precipitating sodium aluminum silicate, the remaining liquid is then cooled and/or seeded to precipitate and recover aluminum hydroxide.

Advantageously, the ore containing alunite is roasted in the dehydration and reduction steps at a temperature of from about 400° C to about 850° C to effect the removal of the water of hydration and sulfates existing as $Al_2(SO_4)_3$. Preferably the ore is roasted in the dehydration and reduction steps at a temperature of from about 500° C to about 650° C. Advantageously, these roasting steps are carried out at atmospheric pressure in fluidized-bed reactors, rotating kilns or the like, and the preferred temperatures maintained for from about one-half minute to about six hours in each step. The residence time within each step varying greatly depending upon the type equipment used.

The reducing atmosphere in the reduction roast can be reducing gases such as hydrogen, hydrocarbons, carbon monoxide or mixtures thereof. The sulfur dioxide emitted from the reduction roast can then be converted to commercial products such as elemental sulfur, sulfuric acid and the like.

Advantageously the reduced ore is oxidized at a temperature from about 450° C to about 650° C. Preferably the temperature range for the oxidation step is from about 550° C to about 580° C. The time of the oxidation step is dependent upon temperature and oxidizing atmosphere availability.

The oxidizing atmosphere of the oxidation roast can be air, oxygen or mixtures of air and other oxidizing gases. The sulfur oxides emitted rom the oxidation roast can also be converted to commercial products such as elemental sulfur, sulfuric acid and the like. The ore from the oxidation step is then leached with a weak base at a pH from about 8 to about 10.5. Preferably the basic leach step is carried out at a pH from about 9 to about 10. Advantageously the weak base is selected from the group consisting of ammonium hydroxide and alkali metal hydroxides. The most preferred weak base for the basic leach step is potassium hydroxide.

By using different hydroxides it is possible to tailor the end produce to have various desired properties.

The use of potassium hydroxide or ammonium hydroxide in the basic leach step will result in a byproduct which is high in potassium or ammonium and is suitable for use as a fertilizer.

The advantages of the basic leach step over prior art processes is that its use results in lower operational costs through the use of a smaller amount of alkali metal hydroxides in subsequent digestion steps and in lowering or eliminating the formation and precipitation of trihydrates in subsequent processing steps.

The contact time between the oxidized ore and the weak base in the basic leach step advantageously is from about 5 minutes to about 60 minutes. Preferably the time of contact between the oxidized ore and the weak base is from about 25 minutes to about 35 minutes.

Advantageously the oxidized ore is added to the weak base in an air atmosphere at atmospheric pressure and agitated. Preferably the oxidized ore is added to the weak base at a pressure in excess of atmospheric pressure in an air atmosphere with agitation.

The pH of the weak base leach step is of great importance because of trihydrate is formed, solutionized and later precipitated in the basic leach step when the pH is above about 10.5. Such a trihydrate will readily dissolve in subsequent processing steps and therefore interferes with the formation and/or separation of the desired end products. It is believed that the trihydrate formed at a pH in excess of about 10.5 in the weak base leach step has the formula $AlOOH \cdot 2H_2O$.

The ore is then leached with a solvent, preferably water or an alkaline solution. The liquid and solid portions of the resultant slurry are then separated in a first separation step by conventional means such as thickner tanks, filters, belt extractor filters and the like.

The solid portion therein separated is then digested with a mixture of alkali metal hydroxides having a concentration of up to about 300 grams per liter caustic expressed as $Na_2CO_3$. Preferably the alkali metal hydroxides used are sodium hydroxide and potassium hydroxide. Advantageously, the digestion conditions are: atmospheric pressure, a temperature of from about 80° C to about 110° C and a digestion time of from about five minutes to about two hours.

The digestion product is then separated in a second separation step by conventional means such as thickener tanks, filters and the like. The separated liquid portion is then treated to remove excess silica by heating and/or seeding with sodium aluminum silicates. Advantageously agitation is applied to this liquid portion during the removal of excess silica. If heating at atmospheric pressure is used in this step, a temperature of about 90° C for at least one hour is required. If heating with pressure in excess of one atmosphere is used, a temperature of from about 90° C to about 200° C for at least fifteen minutes is required. Advantageously the heating is carried out at a pressure of from about 0.5 atmosphere to about 7 atmospheres for a time of at least fifteen minutes.

After removal of silica, which is precipitated as sodium aluminum silicate, the resultant liquid is cooled to precipitate crystalline aluminum hydroxide, which is then separated from the liquid. Advantageously the liquid is seeded with aluminum hydroxide crystals during the cooling step to accelerate the rate of precipitation and to control the particle size of crystalline aluminum hydroxide.

The liquid from the first separation step may be processed by vacuum or cooling cyrstallization to precipitate potassium sulfate.

The following specific example is intended to be illustrative of the invention herein described, but not limiting of the scope thereof.

EXAMPLE

A charge of alunite ore weighing about 200 grams was placed in a Vycor retort. The retort was then placed in a preheated electric furnace, the furnace lid was closed and the temperature raised to about 580° to about 600° C and held at this level for about 60 minutes. During roasting, the retort was rotated continuously at about one rmp and evolved gases were swept from the retort by a stream of air.

After roasting under the conditions recited above the ore was roasted for about 30 minutes at a temperature of about 580° C in an atmosphere consisting of 50 percent hydrogen gas and 50 percent carbon monoxide gas. At the conclusion of this roast in a reducing atmosphere the roasting chamber was purged with nitrogen and the ore roasted for about 30 minutes in an air atmosphere. The ore from the oxidation roast step was then leached for 30 minutes with a sufficient amount of potassium hydroxide solution to give a pH of 9.

The basic leached ore was then separated from the leach solution and ground to 35 mesh and mixed with water at a 25 percent solids level and the slurry was heated to between 75° and 80° C and mechanically agitated while being held at this temperature for one hour.

After separation of the liquid and solid portions of the water leach slurry the solid portion thereof was digested in a caustic solution comprising essentially sodium and potassium hydroxides having a caustic concentration of about 220 grams per liter as $Na_2CO_3$. The slurry was boiled at a pressure of one atmosphere with mechanical agitation for one hour and the liquid and solid portions thereof separated.

The digestion liquor was then introduced into a precipitation assembly consisting of one liter graduated cylinders equipped with paddles to stir the liquid from top to bottom. The precipitations were maintained at a constant temperature of 55° C and rotated constantly at 125 to 150 rpm and stirred just enough to prevent settling. After introduction of the digestion liquor into the precipitation apparatus and stirring was started, 20 grams of wet seed (15 gm $Al_2O_3$ dry) were introduced in small portions until all seed material had been added. Precipitation was then allowed to proceed with constant stirring. At the termination of the test 52 percent of the extracted alumina had been precipitated and was calcined at 1000° C.

This invention has been described in detail with particular reference to preferred embodiments thereof, it should be understood that variations and modifications can be effected within the spirit and scope of the invention as described hereinbefore and as defined in the appended claims.

What is claimed is:

1. A method for recovering aluminum hydroxide and other valuable constituents from ore containing alunite, comprising the steps of:
    a. roasting the ore to remove water of hydration,
    b. roasting the dehydrated ore resulting from step (a) in a reducing atmosphere to remove sulfate, c. roasting the reduced ore resulting from step (b) in an oxidizing atmosphere to convert sulfides to sulfur oxides,
d. leaching the oxidized ore from step (c) with an aqueous containing inorganic base at a pH of from about 8 to about 10.5 to avoid the subsequent formation of trihydrates,
e. leaching the oxidized ore resulting from step (d) with an aqueous containing inorganic solvent to remove potassium and sulfate,
f. separating the liquid and solid portions of the slurry resulting from step (e),
g. digesting the solid portion resulting from step (f) with an aqueous mixture of alkali metal hydroxides at a concentration and at a temperature sufficient to extract the aluminum content from said solid portion,
h. separating the liquid and solid portions of the digestion mixture resulting from step (g),
i. precipitating silica from the liquid portion resulting from step (h),
j. separating the supernatant from the precipitant resulting from step (i),
k. precipitating aluminum hydroxide from the supernatant resulting from step (j), and
l. separating the supernatant from the precipitated aluminum hydroxide resulting from step (k).

2. The method of claim 1 in which step (a) and step (b) are carried out at a temperature of from about 400° C to about 850° C for a time of from about one-half minute to about six hours for each step.

3. The method of claim 1 in which step (a) and step (b) are carried out at a temperature of from about 500° C to about 650° C for a time of from about one-half minute to about six hours for each step.

4. The method of claim 1 in which step (c) is carried out at a temperature of from about 450° C to about 650° C.

5. The method of claim 4 in which step (c) is carried out at a temperature of from about 550° C to about 580° C.

6. The method of claim 1 wherein the weak base of step (d) is selected from the group consisting of ammonium hydroxide and alkali metal hydroxide.

7. The method of claim 6 wherein the alkali metal hydroxide of step (d) is potassium hydroxide.

8. The method of claim 1 in which step (d) is carried out at a pH of from about 9 to about 10.

9. The method of claim 1 wherein the reducing atmosphere of step (b) is selected from the group consisting of hydrogen, hydrocarbons, carbon monoxide and mixtures thereof.

10. The method of claim 1 wherein the oxidizing atmosphere of step (c) is selected from the group consisting of air, oxygen and mixtures thereof.

11. The method of claim 1 wherein step (d) the time of contact between the oxidized ore and the weak base is from about 5 minutes to about 60 minutes.

12. The method of claim 11 wherein step (d) the time of contact between the oxidized ore and the weak base is from about 25 minutes to about 35 minutes.

13. The method of claim 1 wherein step (d) the oxidized ore is added to the weak base in an air atmosphere and agitated.

14. The method of claim 13 wherein step (d) the oxidized ore is added at greater than atmospheric pressure to the weak base.

15. The method of claim 1 wherein the solvent of step (e) is selected from the group consisting of water and alkaline solutions.

16. The method of claim 1 wherein the alkali metal hydroxides of step (g) are selected from the group consisting of sodium hydroxide and potassium hydroxide.

17. The method of claim 1 in which the precipitation of silica of step (i) is carried out by heating the liquid to a temperature of about 90° C for at least one hour at atmospheric pressure.

18. The method of claim 1 in which the precipitation of silica of step (i) is carried out by heating the liquid at a pressure of from about 0.5 atmospheres to about 7 atmospheres at a temperature of from about 90° C to about 200° C for at least 15 minutes.

19. The method of claim 1 in which the precipitation of silica of step (i) is accelerated by seeding with sodium aluminum silicates.

20. The method of claim 1 in which the precipitation of aluminum hydroxide of step (k) is carried out by cooling the liquid until crystalline aluminum hydroxide is formed.

21. The method of claim 1 in which the precipitation of aluminum hydroxide of step (k) is accelerated by seeding with aluminum hydroxide crystals.

22. The method of claim 1 containing the additional step of precipitating potassium sulfate from the liquid resulting from step (f).

23. The method of claim 1 containing the additional step of converting the sulfate removed in step (b) into sulfuric acid.

24. The method of claim 1 containing the additional step of converting the sulfate removed in step (b) into elemental sulfur.

* * * * *